United States Patent [19]

Harvey

[11] Patent Number: 4,986,027
[45] Date of Patent: Jan. 22, 1991

[54] HYDROPONIC GROWTH SYSTEM

[76] Inventor: Roy Harvey, R.R. 5 Poleline Road, Thunder Bay, Ontario, Canada, P7C 5M9

[21] Appl. No.: 206,619

[22] Filed: Jun. 14, 1988

Related U.S. Application Data

[63] Continuation of Ser. No. 916,119, Oct. 6, 1986, abandoned.

[30] Foreign Application Priority Data

Nov. 15, 1985 [CA] Canada ................................. 495436

[51] Int. Cl.$^5$ ............................................. A01G 31/00
[52] U.S. Cl. .......................................... 47/59; 47/82; 47/83
[58] Field of Search ................... 47/67, 82, 83, 59, 62, 47/64, 79, 39

[56] References Cited

U.S. PATENT DOCUMENTS

| | | | |
|---|---|---|---|
| 176,450 | 7/1917 | Swartz . | |
| 2,486,512 | 11/1949 | Armstrong | 47/79 X |
| 2,956,370 | 10/1960 | Wieboldt | 47/67 |
| 3,063,196 | 11/1962 | Pauer | 47/82 |
| 4,006,559 | 2/1977 | Carlyon, Jr. | 47/82 |
| 4,027,986 | 6/1977 | Patrick | 47/1.5 |
| 4,033,072 | 7/1977 | Kobayashi et al. | 47/62 |
| 4,059,922 | 11/1977 | DiGiancinto . | |
| 4,118,891 | 10/1978 | Kehl et al. | 47/59 |
| 4,149,339 | 4/1979 | Hall et al. | 47/67 |
| 4,161,085 | 7/1979 | Moffet, Jr. | 47/82 |
| 4,188,891 | 2/1980 | Boyajian . | |
| 4,218,847 | 8/1980 | Leroux | 47/62 |
| 4,250,666 | 2/1981 | Rakestraw . | |
| 4,268,994 | 5/1981 | Urai | 47/82 |
| 4,295,296 | 10/1981 | Kinghorn . | |
| 4,363,189 | 12/1982 | O'Donnell | 47/73 |
| 4,419,843 | 12/1983 | Johnson et al. | 47/82 |
| 4,454,684 | 6/1984 | O'Hare | 47/59 |
| 4,622,777 | 11/1986 | Greene, Jr. | 47/67 |
| 4,756,120 | 7/1988 | Arledge | 47/59 |
| 4,825,592 | 5/1989 | Earls | 47/82 |

FOREIGN PATENT DOCUMENTS

| | | |
|---|---|---|
| 823874 | 9/1969 | Canada . |
| 971363 | 7/1975 | Canada . |
| 1017146 | 9/1977 | Canada . |
| 1107069 | 8/1981 | Canada . |
| 416200 | 6/1967 | Switzerland ........................... 47/63 |
| 2070403 | 9/1981 | United Kingdom .................. 47/67 |
| 2147484 | 5/1985 | United Kingdom .................. 47/67 |

Primary Examiner—Danton D. DeMille
Attorney, Agent, or Firm—Merchant, Gould, Smith, Edell, Welter & Schmidt

[57] ABSTRACT

There is disclosed a structure for supporting the growth of plants, comprising a flexible tubular element in the wall of which slits are provided. Closure means define with the tubular element an elongated enclosed area that is filled with a fluid and root permeable material for supporting the roots of plants. A fluid nutrient is supplied by a pump to the material. The tubular element may be suspended from one of its ends and supplied at the upper end with the fluid nutrient to support plant growth through the perforations from the particulate material. The construction is cheaply and easily manufactured, and easily used by a lay person.

15 Claims, 1 Drawing Sheet

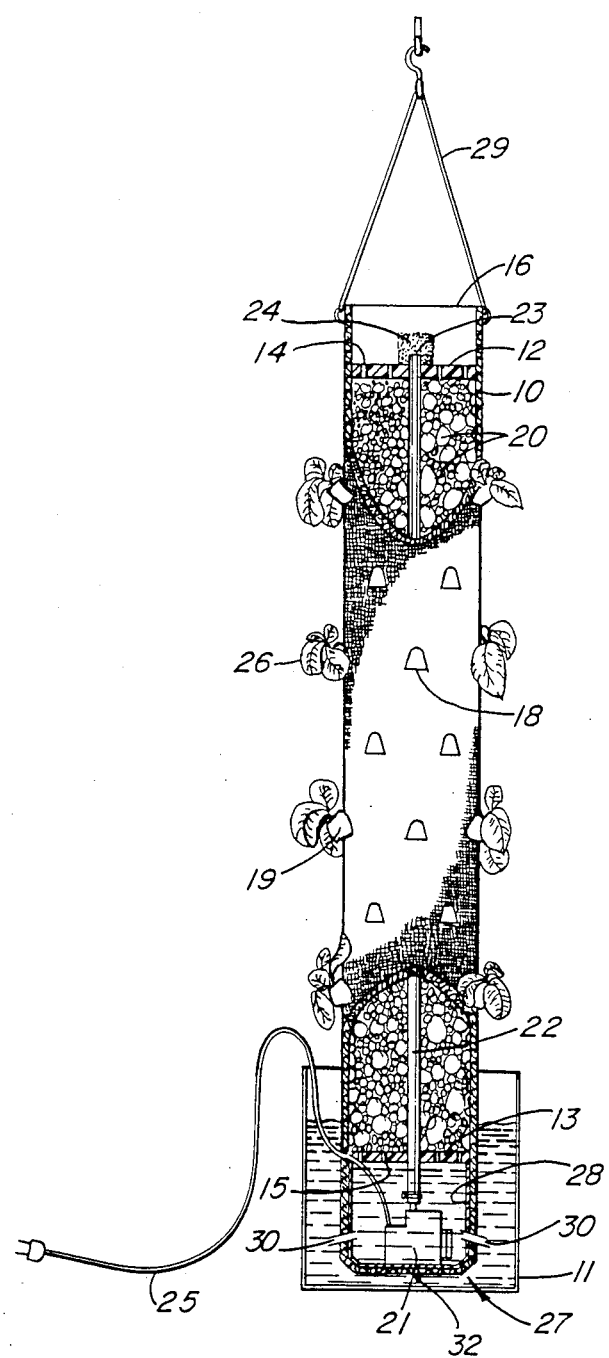

HYDROPONIC GROWTH SYSTEM

This is a continuation of application Ser. No. 916,119, filed Oct. 6, 1986, now abandoned.

TECHNICAL FIELD

This invention relates to hydroponic growth structures, and more particularly to such structures that are capable of vertical orientation for growing a column of plants, either for decorative purposes in the home or for commercial purposes in a greenhouse.

BACKGROUND OF THE INVENTION

Such structures are known in the art, and typical prior art patents are the following:

Can Pat. No. 176,450, Apr. 17, 1917 - James Swartz
Can Pat. No. 823,874, Sept. 30, 1969 - Hugh A. Johnson, Sr.
Can Pat. No. 971,363, July 22, 1975 - Richard A. Carlyon, Jr.
Can Pat. No. 1,017,146, Sept. 13,1977 - Tatemoto Hitoshi, et al
Can Pat. No. 1,107,069, Aug. 18, 1981 - Maria Schmidt
U.S. Pat. No. 3,063,196, Nov. 13, 1962 - Edward E. Pauer
U.S. Pat. No. 4,059,922, Nov. 29, 1977 - Joseph A. DiGiscinto
U.S. Pat. No. 4,218,847, Aug. 26, 1980 - Frank W. Leroux
U.S. Pat. No. 4,250,666, Feb. 17, 1981 - Roy R. Rakestraw
U.S. Pat. No. 4,268,994, May 26, 1981 -Urai Muneharu
U.S. Pat. No. 4,295,296, Oct. 20, 1981 - Michael H. Kinghorn
U.S. Pat. No. 4,419,843, Dec. 13, 1983 - High A. Johnson, Sr.
U.S. Pat. No. 4,454,684, June 19, 1984 - Louis R. O'Hare While the above patents disclose constructions in which plants are grown in a tiered or upright support, many of the disclosed constructions are not suitable for home use. Further, they do not lend themselves to easy transportation and due to their particular features of construction, are expensive to construct.

There is a requirement for a cheap, economical planter that can grow plants, especially indoor plants, in a vertical orientation so that an attractive and practical construction results that is affordable and easy for a lay person to use.

There further is a requirement for a construction that can be sold as a kit and assembled by the ultimate user. It is therefore the purpose of the present invention to provide an apparatus for hydroponic cultivation that can be cheaply manufactured from readily available materials, easily assembled and effectively used in the home or in a commercial environment.

SUMMARY OF THE INVENTION

The present invention accordingly provides a structure for supporting the growth of plants comprising;

a flexible tubular element having a perforate wall;

a pair of closure means for defining with said element an elongated enclosed area;

fluid and root permeable material for filling the enclosed area and for supporting the rots of the plants, and;

means for supplying a fluid nutrient to the material, whereby the tubular element may be suspended from one of its ends, and supplied at the one end with the fluid nutrient, to support plant growth through the perforations from the particulate material.

Due to the nature of the materials used in the construction of preferred forms of the above invention, the components are easily packaged and sold and equally easily assembled by a user. No special tools are required. Further, no special skills are required for growing plants in the structure according to the invention.

BRIEF DESCRIPTION OF THE DRAWING

Referring now the attached drawing, the FIGURE illustrates, partially in section, an hydroponic growth supporting structure according to the invention.

DETAILED DESCRIPTION OF THE PREFERRED EMBODIMENT

In the drawing, 10 is a flexible tubular element defining a sack formed from, for example, polypropylene woven material and having an open upper end 16 and a closed lower end 27, the lower end being, for example, sewn at 32 to close it. Adjacent the upper and lower ends there are disposed perforated plates 12 and 13 which extend across the section of the tube. An inner sump 28 vented at 30 to permit the passage of fluid is disposed within the lower end of the element 10, and houses a pump 21 which functions in a manner to be described below. Sump 28 may be formed from a suitable thermoplastic material. Vents 30 perforate the element 10, but other means may be provided to allow the passage of fluid between the sump 28 and receptacle 11. Instead of sewing the lower end 27 to close it, a sliding fastener or Velcro (TM) may be used, to allow access to the pump 21 if the latter is of the type that might require periodic servicing.

Extending upwardly from the upper end 16 of the element 10 is a hanger 29 by which the structure may be suspended, for example from a ceiling or a beam.

Disposed within the element 10, and between the plates 12 and 13, is a mass of particulate material, such as styrofoam beads, identified by the reference numeral 20.

Adapted to be disposed below the lower sump 28 is the receptacle 11, adapted to contain an hydroponic growth medium. Such materials are commercially available, and normally comprise nutrients that are mixed with water in a predetermined ratio to support plant growth.

Extending upwardly from the pump 21, through the styrofoam beads 20, is a flexible tube 22, which passes both through the lower plate and the upper plate 12 to a mouth 23 just above the upper plate 12. A replacable filter-pacifier 24 ay be disposed at the mouth 23 of the tube 22 so that fluid pumped upwardly through the tube 22 by the pump 21 is dispersed without agitation over the upper surface of the plate 12. The fluid then passes through openings 14 in the plate 12 and percolates downwardly through the styrofoam beads 20, after which excess fluid passes, through openings 15 in the lower plate 13 and into the inner sump 28.

Evenly spaced around the circumference of the tubular element 10 are a number of slits 18, preferably horizontal. Within the slits 18 may be disposed mineral wool plugs 19. These, if used, support the roots of young plants 26.

In use, inner sump 28 is inserted into the element 10 to rest against the lower end 27. Plate 13 is then inserted, and the element 10 is then filled with the styrofoam beads 20, after the tube 22 is threaded through the element 10, taking care to ensure that the mouth of the tube 23 remains above the level of the beads 20. The upper disc 12 is then placed in position, and the mouth of the tube 22 threaded through an opening provided in the disc 12. The filter-pacifier 24 is then put in place. After this, the element 10 may be suspended by the hanger 29 in a suitable position, after which the receptacle 11 is placed in position below the tubular element 10. The receptacle 11 is filled with hydroponic growth medium, at which point the apparatus is ready for use by actuating the pump 21, which may be driven by electrical current from an electrical outlet (not shown) into which the plug 31 is placed t provide electricity through cord 25 to the motor 21.

There are many ways in which plants may be grown in the above described apparatus. For example, a young plant with developing roots may be inserted directly through a slit 18 so that its roots grow into the beads 20. Alternatively, seeds can be placed within mineral wool plugs 31 in a separate container until germination has taken place after which the plug 31 is inserted through a slit 18 so that root growth can continue into the beads 20 and growth may proceed in the same manner. It is further possible to effect rooting of cuttings by inserting the ends of the latter through the openings 18 to expose them to the flow of hydroponic solution through the beads 20, without the use of a plug 31.

It will be appreciated that for a commercial operation a number of the above structures can be deployed in an existing greenhouse above a single fluid receptacle, with the omission of the pump 21 and tube 22 and instead the use of a manifold supply system with a branch for each element 10.

It will also be appreciated that the structure, when plant growth has progressed, provides a storage medium for active and passive solar energy when used in a greenhouse of the home.

The embodiments of the invention in which an exclusive property or privilege is claimed are defined as follows:

1. A structure for supporting the growth of plants, said structure comprising:
    a collapsible flexible woven fabric tubular element having a perforate wall and first and second ends;
    (i) said perforate wall having slits therein;
    (ii) said structure including fibrous plugs adjacent said slits for supporting roots of plants which may grow through said slits and for retaining material within said structure;
  (b) closure means operably positioned for expanding said tubular element and defining within said tubular element an elongate enclosed volume; said closure means comprising first and second perforate rigid disc members;
    (i) said first disc member being operably mounted in, and spaced from, said first end of said tubular element; and,
    (ii) said second disc member being operably mounted in, and spaced from, said second end of said tubular element;
  (c) fluid and rot permeable material filling said elongate enclosed volume, for supporting the roots of the plants;
  (d) seal means for enclosing said tubular element second end;
  (e) suspension means constructed and arranged for vertical suspension and said tubular element by said first end; and
  (f) means for supplying a fluid nutrient to the fluid and root permeable material; said means for supplying fluid nutrient including: a conduit element operably attached to a pump means located proximate said second end, said conduit element extending to a conduit mouth above said fluid and root permeable material; and pump means for transporting fluid nutrient upwardly through said conduit element and outwardly from said conduit mouth at a location substantially adjacent said tubular element first end, wherein said first disc member, said tubular element and said fluid and root permeable material direct fluid flow downwardly through said fluid and root permeable material to substantially adjacent said tubular element second end.

2. A structure as defined in claim 1 wherein said permeable material comprises styrofoam beads.

3. A structure as defined in claim 1 wherein:
  (a) the means for supplying a fluid nutrient includes a receptacle connected to and operably disposed below said tubular element when said structure is suspended in a vertical position; and
  (b) wherein said pump means includes means for pumping fluid disposed in the receptacle upward to the conduit mouth, whereby the fluid may percolate downwardly through the material, with unused fluid returning to the receptacle; and further,
  (c) wherein the fluid and root permeable material comprises styrofoam beads.

4. A structure as defined in claim 1 further comprising:
  (a) a receptacle for disposition below the tubular element when said structure is suspended in a vertical position, wherein said receptacle is connected to and operably disposed below said tubular element, and wherein said receptacle comprises an element of the means for supplying a fluid nutrient; and
  (b) fluid transport means for pumping fluid disposed in the receptacle upward to adjacent said first end of said tubular element, whereby the fluid may percolate downwardly through the material, unused fluid returning to the receptacle.

5. A structure as defined in claim 1 wherein the percolate means includes a filter-pacifier constructed and arranged to distribute the fluid above said first disc member.

6. A structure as defined in claim 1, wherein the flexible tubular element comprises a polypropylene fabric.

7. A structure as defined in claim 1 wherein the fibrous plugs comprise mineral wool.

8. A structure for supporting the growth of plants comprising:
  (a) a collapsible flexible woven fabric tubular element having a perforate wall and first and second ends;
    (i) said perforate wall having slits therein;
    (ii) said structure including fibrous plugs adjacent said slits for supporting roots of plants which may grow through said slits and for retaining material within said structure;

(b) closure means operably positionable for expanding said tubular element and defining within said tubular element an elongate enclosed volume; said closure means comprising first and second perforate rigid disc members;
  (i) said first disc member being operably mounted in, and spaced from, said first end of said tubular element; and,
  (ii) said second disc member being operably mounted in, and spaced from, said second end of said tubular element;
(c) fluid and root permeable material filling said elongate enclosed volume and for supporting the roots of the plants;
(d) seal means for enclosing said tubular element second end;
(e) suspension means constructed and arranged for suspension of said tubular element by said first end;
(f) means for supplying a fluid nutrient to the fluid and root permeable material; said means for supplying fluid nutrient including:
  (i) a conduit operably attached to a pump means located proximate said second end, said conduit element extending to a conduit mouth above said fluid and root permeable material;
  (ii) pump means for transporting fluid nutrient through said conduit element and outwardly from said conduit mouth at a location substantially adjacent said tubular element first end, wherein said first disc member, said tubular element and said fluid and root permeable material direct fluid flow downwardly through said fluid and root permeable material to substantially adjacent said tubular element second end; and,
  (iii) a filter-pacifier secured to said conduit mouth and arranged to distribute said fluid above said fluid and root permeable material.

9. A structure as defined in claim 8 wherein said permeable material comprises styrofoam beads.

10. A structure as defined in claim 8 wherein:
  (a) the means for supplying a fluid nutrient includes a receptacle connected to and operably disposed below said tubular element when said structure is suspended in a vertical position; and
  (b) wherein said pump means includes means for pumping fluid disposed in the receptacle upward through said conduit element, whereby the fluid may percolate downwardly through the material, with unused fluid returning to the receptacle; and further,
  (c) wherein the material comprises styrofoam beads.

11. A structure as defined in claim 8 further comprising:
  (a) a receptacle for disposition below the second disc when said structure is suspended in a vertical position, wherein said receptacle is connected to and operably disposed below said tubular element, and wherein said receptacle comprises an element of the means for supplying a fluid nutrient; and
  (b) means for pumping fluid disposed in the receptacle upward through said conduit element and outwardly from said conduit mouth, whereby the fluid may percolate downwardly through the material, unused fluid returning to the receptacle.

12. A structure as defined in claim 8, wherein the flexible tubular element comprises a polypropylene fabric.

13. A structure as defined in claim 8 wherein the fibrous plugs comprise a mineral wool.

14. A structure for supporting the growth of plants, said structure comprising:
  (a) a collapsible flexible woven fabric tubular element comprising a polypropylene fabric having a perforate wall and first and second ends;
    (i) said perforate wall having slits therein;
    (ii) said structure including fibrous plugs adjacent said slits for supporting roots of plants which may grow through said slits and for retaining material within said structure;
  (b) closure means operably positionable for expanding said tubular element and defining within said tubular element an elongate enclosed volume; said closure means comprising first and second perforate rigid disc members;
    (i) said first disc member being operably mounted in, and spaced from, said first end of said tubular element; and,
    (ii) said second disc member being operably mounted in, and spaced from, said second end of said tubular element;
  (c) fluid and root permeable material, comprising styrofoam, filling said elongate enclosed volume;
  (d) seal means for enclosing said tubular element second end;
  (e) suspension means constructed and arranged for vertical suspension of said tubular element by said first end;
  (f) means for supplying a fluid nutrient to the fluid and root permeable material; said means for supplying fluid nutrient including: a conduit element operably attached to a pump means located proximate said second end, said conduit element extending to a conduit mouth above said fluid and root permeable material; and pump means for transporting fluid nutrient through said conduit element and outwardly from said conduit mouth at a location substantially adjacent said first tubular element first end, wherein said first disc member, said tubular element and said fluid and root permeable material direct fluid flow downwardly through said fluid and root permeable material to substantially adjacent said first conduit element second end; and
  (g) a filter-pacifier secured to said conduit mouth and constructed and arranged to distribute fluid above said first disc member.

15. A kit containing elements for constructing a structure for supporting the growth of plants, said kit comprising:
  (a) a collapsible flexible woven fabric tubular element comprising a polypropylene fabric having a perforate wall and first and second ends;
    (i) said perforate wall having slits therein;
    (ii) fibrous plugs insertable into said tubular element slits for supporting roots of plants which may grow through said slits and for retaining material within said structure;
  (b) closure means operably positionable for expanding said tubular element and defining within said tubular element an elongate enclosed volume; said closure means comprising first and second perforate rigid disc members;
    (i) said first disc member being insertable in, to be spaced from, said first end of said tubular element; and, (ii) said second disc member being insertable in, to be spaced from, said second end of said tubular element;

(c) fluid and root permeable material comprising a porous medium for filling said elongate enclosed volume and for supporting roots of the plants;

(d) seal means for enclosing said tubular element second end;

(e) suspension means for suspending said tubular element by said first end;

(f) means for supplying a fluid nutrient to the fluid and root permeable material; said means for supplying fluid nutrient including: a conduit element operably attached to a pump means located proximate said second end, said conduit element extending to a conduit mouth and positionable such that said conduit mouth is above said fluid and root permeable material; and pump means for transporting fluid nutrient through said conduit element and outwardly from said conduit mouth at a location substantially adjacent said first tubular element first end; and (g) a filter-pacifier adapted to be securely mounted to said conduit mouth.

* * * * *